Figure 1:
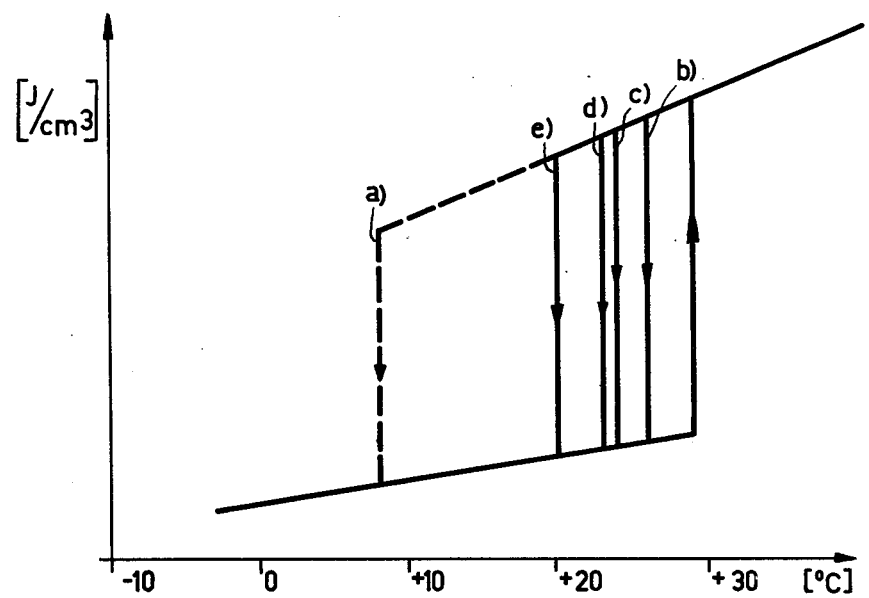

United States Patent [19]

Schröder et al.

[11] 4,189,394
[45] Feb. 19, 1980

[54] HEAT STORAGE MATERIAL COMPRISING CALCIUM CHLORIDE-HEXAHYDRATE AND A NUCLEATING AGENT

[75] Inventors: Johann Schröder; Klaus Gawron, both of Aachen, Fed. Rep. of Germany

[73] Assignee: U.S. Philips Corporation, New York, N.Y.

[21] Appl. No.: 922,824

[22] Filed: Jul. 10, 1978

[30] Foreign Application Priority Data

Jul. 13, 1977 [DE] Fed. Rep. of Germany ....... 2731572

[51] Int. Cl.² ............................................... C09K 5/06
[52] U.S. Cl. .................................................... 252/70
[58] Field of Search .......................... 252/70; 126/400; 23/301

[56] References Cited

FOREIGN PATENT DOCUMENTS 50-90582  7/1975  Japan.
50-90585  7/1975  Japan.
51-43387  4/1976  Japan.
51-70193  6/1976  Japan.
51-76183  7/1976  Japan.

Primary Examiner—Harris A. Pitlick
Attorney, Agent, or Firm—Thomas A. Briody; William J. Streeter; Rolf E. Schneider

[57] ABSTRACT

The utility of calcium chloride-hexahydrate as a heat storage material is improved when barium carbonate, strontium carbonate, barium fluoride, barium fluoride-hydrofluoride and/or strontium fluoride is used as a nucleating agent to prevent supercooling.

6 Claims, 2 Drawing Figures

HEAT STORAGE MATERIAL COMPRISING CALCIUM CHLORIDE-HEXAHYDRATE AND A NUCLEATING AGENT

This invention relates to a heat storage material comprising calcium chloride-hexahydrate and a nucleating agent.

Owing to its high heat capacity and its advantageous melting point (approximately 29° C.) calcium chloride-hexahydrate is a very suitable heat storage material, for example for heating systems in combination with heat pumps, solar collectors, remote-heating installations and heat recovering installations.

However, this heat storage material has also the property that when cooled it supercools to a temperature considerably below the melting point (about 20° C.). In this case it is not possible to withdraw the stored latent heat at the melting point.

It is known that supercooling of calcium chloride-hexahydrate can be prevented by the addition of active aluminium oxide, molecular sieves, silica gel, mica powder, kaolin and/or infusorial earth (Chemical Abstracts 84 (1976) 108449b). These nucleating agents have the drawback, however, that the nucleation is not reliable and does not occur until after periods of time which may vary from several minutes to hours with supercooling temperatures varying over several degrees centigrade.

In addition, it is known that to avoid supercooling of calcium chloride-hexahydrate, calcium bromide-hexahydrate or a mixture thereof, barium hydroxide, strontium hydroxide or their hydrates can be added in the crystalline form as nucleating agents (DT-OS 25 50 106; and Chemical Abstracts 85 (1976) 145699z).

The solubility of these hydroxides is, however, so high ($Ba(OH)_2 = 3.9\%$ by weight; $Sr(OH)_2 = 0.9\%$ by weight) that in contradistinction to the lower concentration limit of 0.0003% by weight, indicated in DT-OS 25 50 106, at least 4% by weight or 1% by weight, respectively, must be added as a nucleating agent, which corresponds to the upper limit of 10% by weight indicated in DT-OS 25 50 106.

As barium salts and strontium salts are expensive and relatively heavy compared to calcium chloride and as the soluble barium and strontium salts are poisonous, the addition of such great quantities of a nucleating agent is very disadvantageous.

It is an object of the present invention to provide a heat storage material comprising calcium chloride-hexahydrate an a more effective nucleating agent.

In accordance with the invention this object is accomplished in that the heat storage material contains barium carbonate, strontium carbonate, barium fluoride, barium fluoride-hydrofluoride and/or strontium fluoride as the nucleating agent.

Thus, instead of a soluble hydroxide, crystals of $BaCO_3$, $SrCO_3$, $BaF_2$, $BaF_2.HF$ and/or $SrF_2$ are used, these crystals having the same nucleating properties as the above-mentioned hydroxides, but a considerably lower solubility:

Solubility in water (20° C.)

$BaCO_3$ $1.7 \cdot 10^{-3}\%$ by weight
$SrCO_3$ $1.0 \cdot 10^{-3}\%$ by weight
$BaF_2$ 0.15% by weight
$SrF_2$ $12.0 \cdot 10^{-3}\%$ by weight.

It is therefore sufficient to add these nucleating agents in quantities of not more than 0.5% by weight, relative to 100 g of water. For the above-mentioned solubilities the lower limit for the quantity of nucleating agent is generally at $1 \cdot 10^{-3}\%$ by weight. The nucleating agents according to the invention are preferably used in quantities of from 0.2 to 0.5% by weight.

Figure 2:
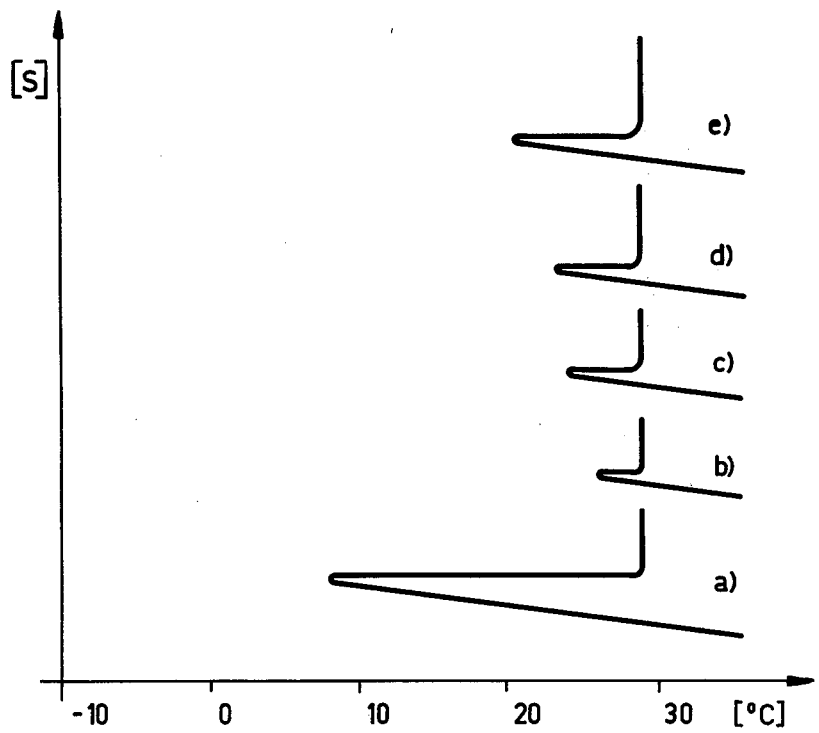

The invention will now be further explained with reference to the accompanying drawing in which FIG. 1 is a graphical representation of the heat content of $CaCl_2.6H_2O$, that is to say the dependence of the heat of fusion and the specific heat (solid, liquid) on the temperature, and FIG. 2 shows cooling curves, that is to say the relative behaviour of cooling versus time.

In the FIGS.

(a) represents $CaCl_2.6H_2O$ without a nucleating agent.
(b) ditto with nucleating agent $BaCO_3$
(c) ditto with nucleating agent $BaF_2.HF$
(d) ditto with nucleating agent $BaF_2$
(e) ditto with nucleating agent $SrCO_3$ or $SrF_2$.

FIG. 1 shows that $CaCl_2.6H_2O$ melts at approximately 29° C. (upwards directed arrow), whereas on congealing a higher or a lower degree of supercooling occurs (downwards directed arrows).

In FIG. 2 the curves of the systems (a), (b), (c), (d) and (e) are, for clarity, shifted relative to one another versus the time. As in FIG. 1 also here the difference in the supercooling effect for the system (a), which does not contain a nucleating agent, and for the systems (b) to (e) according to the invention, which contain the indicated nucleating agents, is clearly noticeable.

What is claimed is:

1. A heat storage material comprising calcium chloride-hexahydrate as the storage medium and barium carbonate, strontium carbonate, barium fluoride, barium fluoride-hydrofluoride and/or strontium fluoride as a nucleating agent.

2. A heat storage material according to claim 1, in which the nucleating agent is present in a quantity of $1 \cdot 10^{-3}$ to 0.5% by weight, relative to 100 g of water.

3. A heat storage material according to claim 1, in which the nucleating agent is barium carbonate in a quantity of $2 \cdot 10^{-3}$ to 0.5% by weight, relative to 100 g of water.

4. A heat storage material according to claim 1, in which the nucleating agent is strontium carbonate in a quantity of $1 \cdot 10^{-3}$ to 0.5% by weight, relative to 100 g of water.

5. A heat storage material according to claim 1, in which the nucleating agent is barium fluoride in a quantity of 0.15 to 0.5% by weight, relative to 100 g of water.

6. A heat storage material according to claim 1, in which the nucleating agent is strontium fluoride in a quantity of $1.2 \cdot 10^{-2}$ to 0.5% by weight, relative to 100 g of water.